(12) United States Patent
Oh et al.

(10) Patent No.: US 8,764,319 B2
(45) Date of Patent: Jul. 1, 2014

(54) CAMERA LENS COVER FOR CELL-PHONE CASE

(71) Applicants: Kwang J Oh, La Crescenta, CA (US); Loren Oh, Irvine, CA (US); Austin Oh, Azusa, CA (US)

(72) Inventors: Kwang J Oh, La Crescenta, CA (US); Loren Oh, Irvine, CA (US); Austin Oh, Azusa, CA (US)

( * ) Notice: Subject to any disclaimer, the term of this patent is extended or adjusted under 35 U.S.C. 154(b) by 0 days.

(21) Appl. No.: 13/663,740

(22) Filed: Oct. 30, 2012

(65) Prior Publication Data

US 2014/0119718 A1    May 1, 2014

(51) Int. Cl.
    *G03B 17/00*    (2006.01)
(52) U.S. Cl.
    USPC .......................................................... 396/448
(58) Field of Classification Search
    USPC .................... 396/448; 359/511; D3/218, 219
    See application file for complete search history.

(56) References Cited

U.S. PATENT DOCUMENTS

| | | | |
|---|---|---|---|
| 2007/0025726 A1* | 2/2007 | Kim | 396/448 |
| 2011/0051335 A1* | 3/2011 | Han | 361/679.01 |
| 2011/0207349 A1* | 8/2011 | Bolshakov et al. | 439/136 |
| 2012/0018322 A1* | 1/2012 | Mongan et al. | 206/316.1 |
| 2012/0019920 A1* | 1/2012 | Mongan et al. | 359/601 |
| 2013/0029507 A1* | 1/2013 | Yang | 439/148 |
| 2013/0063004 A1* | 3/2013 | Lai et al. | 312/223.1 |

FOREIGN PATENT DOCUMENTS

KR    2004097659 A    * 11/2004

* cited by examiner

*Primary Examiner* — Rodney Fuller (74) *Attorney, Agent, or Firm* — John K. Park; Park Law Firm (57) ABSTRACT

A protective case comprises a body, a camera-exposing cutout, a detachable lens cover, and an earphone jack fastener. The camera-exposing cutout is provided at an edge of the body for exposing the camera lens of the mobile device. The detachable lens cover comprises a slide cover and a plug-in cover, and the slide-cover portion is slid into and along the two side edge portions of the camera-exposing cutout and cover the camera lens, and the plug-in cover is plugged in to the camera-exposing cutout perpendicularly to a surface of the body and cover the camera lens. The earphone jack fastener has a first end connected to the detachable lens cover and a second end configured to be plucked into and held in an earphone jack of the mobile device.

14 Claims, 9 Drawing Sheets

CAMERA LENS COVER FOR CELL-PHONE CASE

BACKGROUND OF THE INVENTION

The present invention relates to a camera lens cover for a cell-phone case. More particularly, this invention relates to a camera lens cover for a cell-phone case, which protects the camera lens of cell-phone.

A cellular phone is like a body part to a modern human being. However, cellular phone itself may be too customized to a basic functions by the manufacturers.

A need for an expendable and collapsible sound amplifying cellular phone case has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a protective case for a mobile device with a camera lens cover and a camera flashlight-exposing hole.

An aspect of the invention provides a protective case for a mobile device. The mobile device has a front face, a rear face, a top edge, a bottom edge, two side edges, a camera lens, and a camera flash light.

The protective case comprises a body, a camera-exposing cutout, a detachable lens cover, and an earphone jack fastener.

The body is for covering the rear face of the mobile device and comprises a plurality of fastening portions configured to fasten the mobile device.

The camera-exposing cutout is provided at an edge of the body for exposing the camera lens of the mobile device, and comprises an inner edge portion and two side edge portions.

The detachable lens cover comprises a slide cover and a plug-in cover, and the slide-cover portion is configured to be slid into and along the two side edge portions of the camera-exposing cutout and cover the camera lens, and the plug-in cover is configured to be plugged in to the camera-exposing cutout perpendicularly to a surface of the body and cover the camera lens.

The earphone jack fastener has a first end connected to the detachable lens cover and a second end configured to be plucked into and held in an earphone jack of the mobile device.

Each of the two side edge portions may comprise a V-shaped groove disposed in parallel to the surface of the body, and the V-shaped groove comprises a top tilted wall and a bottom wall, and the bottom wall is configured to receive and hold the slide cover and the top tilted wall is configured to receive and hold the plug-in cover.

The slide cover may comprise a plate portion having a first surface, a second surface, an outer edge extending and bending toward the second surface, and two side edges perpendicular or tilted with respect to the first surface so as to fit into to a top portion of the top tilted wall and a bottom portion of the bottom tilted wall of the V-shaped groove.

The earphone jack fastener may be connected to the outer edge of the slide cover through a string.

The plug-in cover may comprise a resilient sealing skirt so as to be pressed down and held in the V-shaped groove, and the plug-in cover may be disposed on the second surface of the plate portion of the slide cover.

The resilient sealing skirt may be connected to the second surface of the plate portion of the slide cover through a supporting wall.

Each of the two side edges of the slide cover is configured to fit into or to be held close to the top portion of the top tilted wall loosely when the plug-in cover is plugged in perpendicularly.

The protective case may further comprise a decorating figurine on the slide cover.

Another aspect of the invention provides a protective case for a mobile device.

The protective case comprises a body, a camera-exposing cutout, a plug-in lens cover, and an earphone jack fastener.

The body is for covering the rear face of the mobile device and comprising a plurality of fastening portions configured to fasten the mobile device.

The camera-exposing hole is provided at an edge of the body for exposing the camera lens of the mobile device, and comprising an inner edge wall.

The plug-in lens cover is configured to be plugged in to the camera-exposing hole perpendicularly to a surface of the body and cover the camera lens.

The earphone jack fastener has a first end connected to the plug-in lens cover and a second end configured to be plucked into and held in an earphone jack of the mobile device.

The inner edge wall of the camera-exposing hole may be tilted such that a top portion of the camera-exposing hole is more narrow than a bottom portion of the camera-exposing hole so as to receive and hold the plug-in lens cover.

The inner edge wall of the camera-exposing hole may be tilted by from about 5 degrees to about 15 degrees.

The plug-in lens cover may comprise a plate portion and a resilient sealing skirt so as to be pressed down and held in the camera-exposing hole, and the resilient sealing skirt may be disposed on a plate portion.

The protective case may further comprise a decorating figurine on the plate portion of the plug-in lens cover.

The inner edge wall of the camera-exposing hole may comprise a V-shaped protrusion disposed in parallel to the surface of the body, and the V-shaped protrusion comprises a top tilted wall and a bottom tilted wall in parallel to the surface of the body, and the bottom tilted wall is configured to receive and hold the resilient sealing skirt of the plug-in lens cover, and the resilient sealing skirt is connected to a surface of the plate portion of the plug-in lens cover through a supporting wall.

A thickness of the body may be determined such that some portion of obliquely incident light from outside is blocked through working together with the V-shaped protrusion.

The protective case may further comprise a camera-flashlight hole having a truncated conic opening.

The camera-flashlight hole may further comprise a reflecting surface disposed on inner wall surface of the truncated conic opening.

The advantages of the present invention are: (1) the camera lens cover for a cell-phone case is easy to be used; and (2) the camera lens cover for a cell-phone case according to the invention provides a secure way to protect the camera lens still without sacrificing outlook or convenience.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 8 is a perspective view of a lens cover according to another embodiment of the invention;

FIG. 9 is a side view showing the lens cover of FIG. 8 plugged in;

FIGS. 15(a)-(c) show three different structures of a camera-exposing cutout according to still another embodiments of the invention.

DETAILED DESCRIPTION EMBODIMENTS OF THE INVENTION

Figure 12:
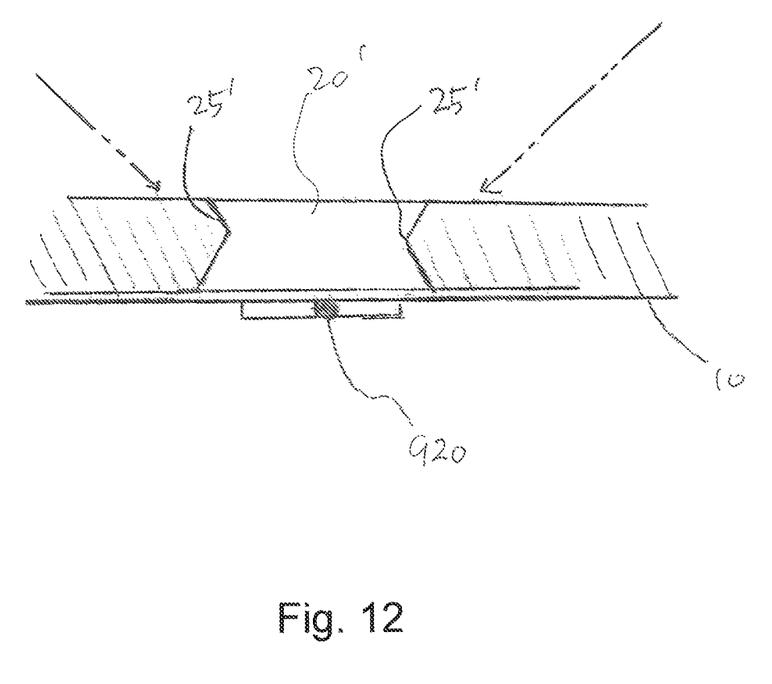
FIG. 12 is a cross-section view of a camera-exposing hole according to still another embodiment of the invention.
Figure 13:
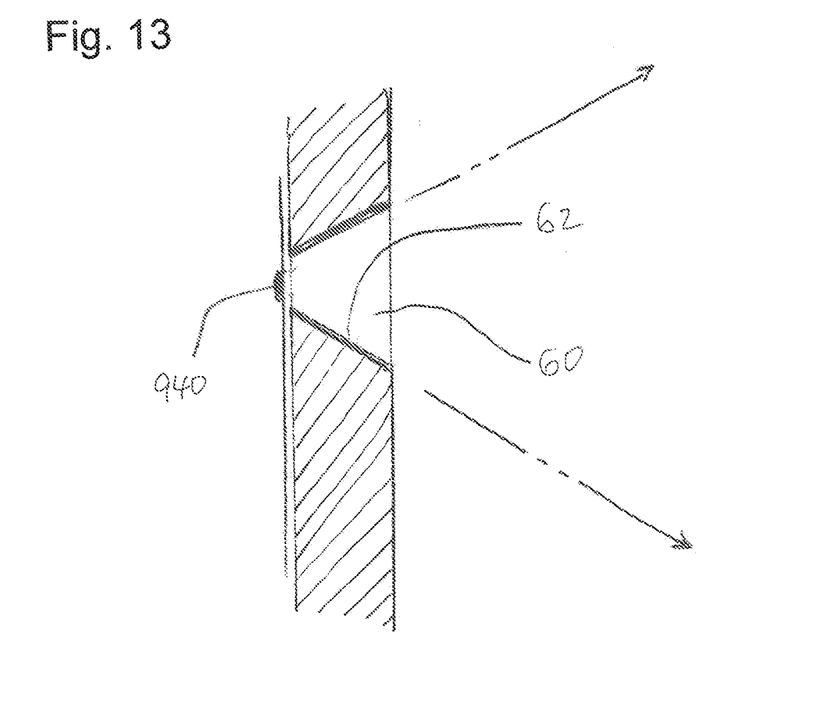
FIG. 13 is a cross-sectional view of a camera flashlight-exposing hole according to still another embodiment of the invention.
Figure 14:
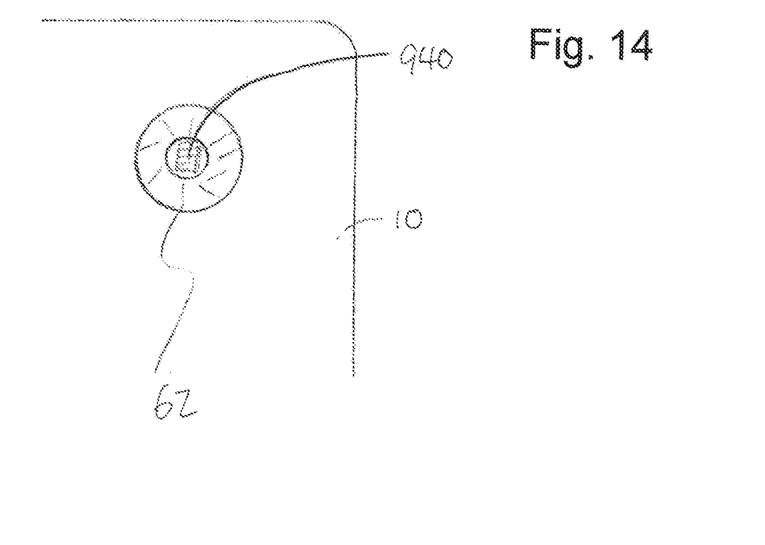
FIG. 14 is a front view of the camera flashlight-exposing hole of FIG. 13.

FIGS. 1-6 show a protective case according to an embodiment of the invention. FIGS. 7-11 show a protective case according to another embodiment of the invention. FIG. 12 shows a protective case according to still another embodiment of the invention. FIGS. 13-14 show a protective case according to another embodiment of the invention.

An object of the invention is to provide a protective case for a mobile device with a camera lens cover and a camera flashlight-exposing hole.

Figure 1:
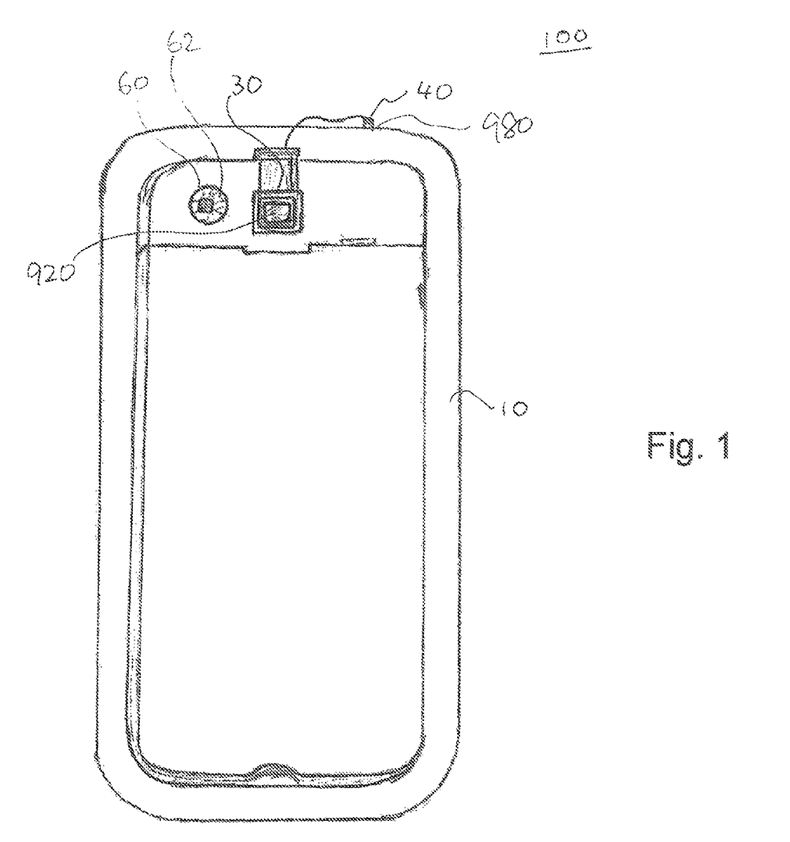
FIG. 1 is a front view showing a protective case according to an embodiment of the invention.
Figure 2:
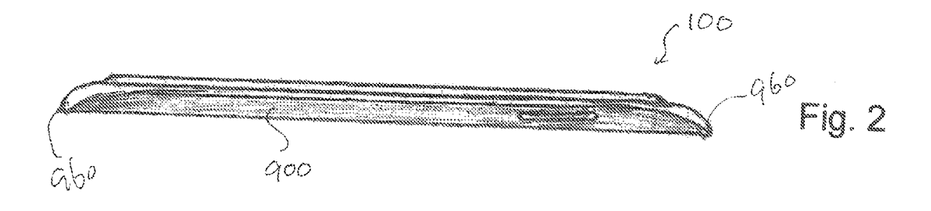
FIG. 2 is a side view showing the protective case of FIG. 1.

An aspect of the invention provides a protective case 100 for a mobile device 900. The mobile device 900 has a front face, a rear face, a top edge, a bottom edge, two side edges, a camera lens 920, and a camera flash light 940.

The protective case 100 comprises a body 10, a camera-exposing cutout 20, a detachable lens cover 30, and an earphone jack fastener 40.

The body 10 is for covering the rear face of the mobile device 900 and comprises a plurality of fastening portions 960 configured to fasten the mobile device 900.

Figures 3, 4:
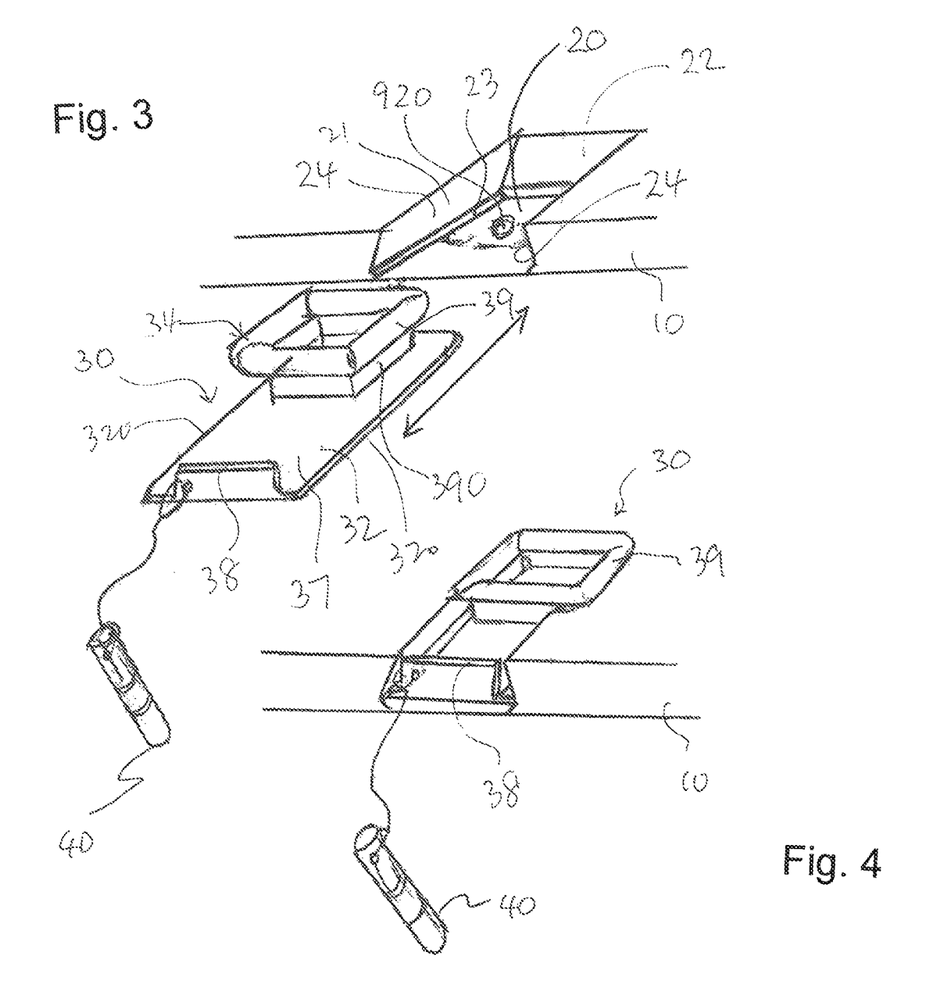
FIG. 3 is a perspective view showing a detachable lens cover before slide according to an embodiment of the invention.
FIG. 4 is a perspective view showing detachable lens cover after slide of FIG. 4.

The camera-exposing cutout 20 is provided at an edge of the body 10 for exposing the camera lens 920 of the mobile device 900, and comprises an inner edge portion 22 and two side edge portions 24 as shown in FIG. 3.

Figure 5:
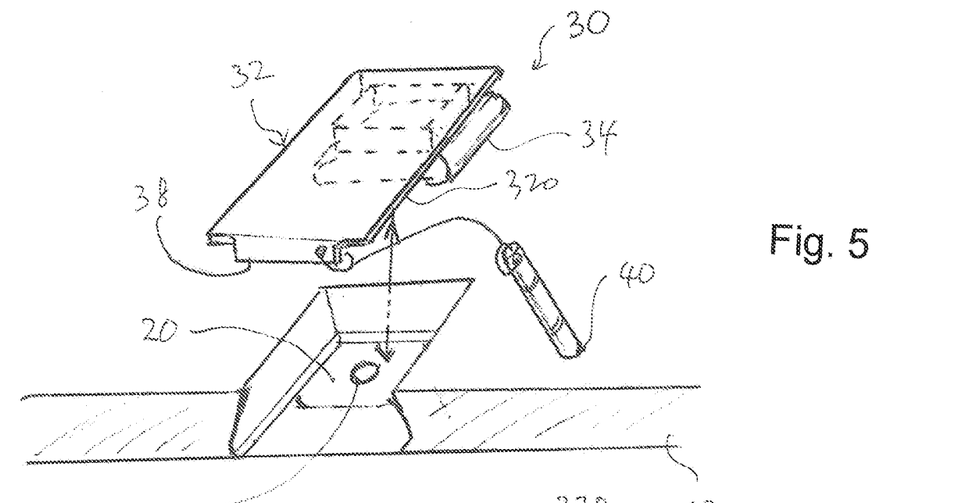
FIG. 5 is a perspective view showing a detachable lens cover before plug-in according to an embodiment of the invention.
Figure 6:
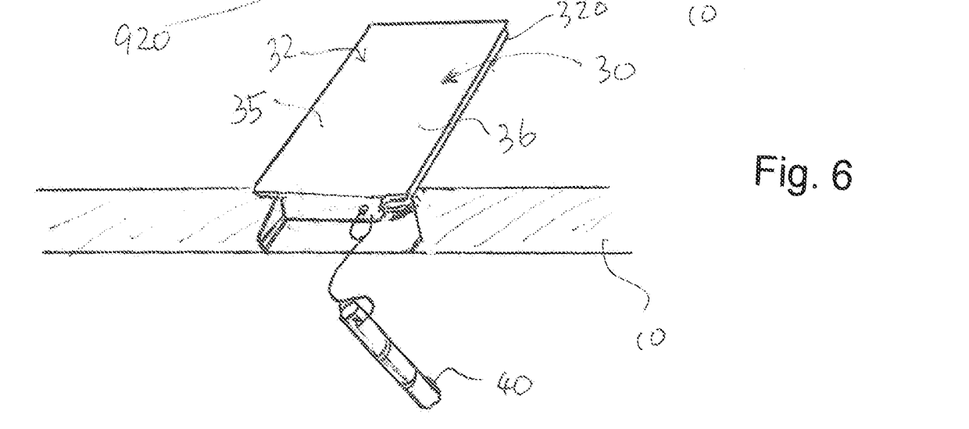
FIG. 6 is a perspective view showing detachable lens cover after plug-in of FIG. 5.

The detachable lens cover 30 comprises a slide cover 32 and a plug-in cover 34, and the slide cover 32 is configured to be slid into and along the two side edge portions 24 of the camera-exposing cutout 20 and cover the camera lens 920 as shown in FIGS. 3 and 4, and the plug-in cover 34 is configured to be plugged in to the camera-exposing cutout 20 perpendicularly to a surface of the body 10 and cover the camera lens 920 as shown in FIGS. 5 and 6.

The earphone jack fastener 40 has a first end connected to the detachable lens cover 30 and a second end configured to be plucked into and held in an earphone jack 980 of the mobile device 900.

Each of the two side edge portions 24 may comprise a V-shaped groove disposed in parallel to the surface of the body 10, and the V-shaped groove comprises a top tilted wall 21 and a bottom wall 23, and the bottom wall 23 is configured to receive and hold the slide cover 32 and the top tilted wall 21 is configured to receive and hold the plug-in cover 34 as shown in FIGS. 3-6.

Figure 15:
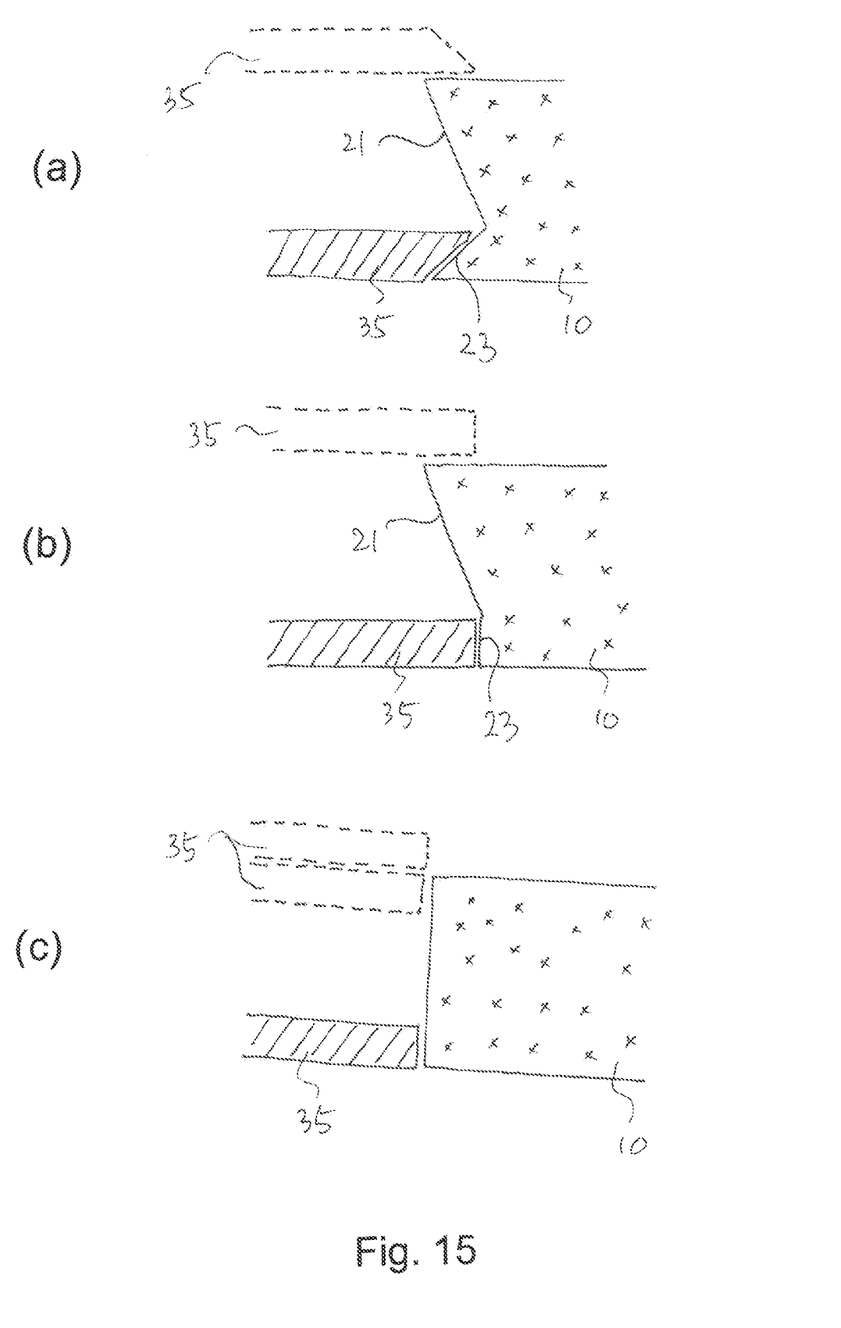

The slide cover 32 may comprise a plate portion 35 having a first surface 36, a second surface 37, an outer edge 38 extending and bending toward the second surface 37, and two side edges 24 perpendicular or tilted with respect to the first surface so as to fit into to a bottom portion the bottom tilted wall 23 of the V-shaped groove as shown in FIG. 15. That is, the bottom wall 23 may be tilted as illustrated or straightly perpendicular to the first surface of plate portion 35.

In certain embodiments, the top tilted wall 21 may be cut to be perpendicular to the first surface so as to be aligned with the bottom wall 23, which is perpendicular to the first surface for itself, of course.

The earphone jack fastener 40 may be connected to the outer edge 38 of the slide cover 32 through a string.

The plug-in cover 34 may comprise a resilient sealing skirt 39 so as to be pressed down and held in the V-shaped groove, and the plug-in cover 34 may be disposed on the second surface 37 of the plate portion 35 of the slide cover 32.

The resilient sealing skirt 39 may be connected to the second surface 38 of the plate portion 35 of the slide cover 32 through a supporting wall 390.

Each of the two side edges 320 of the slide cover 32 may be configured to fit into or to be held close to the top portion of the top tilted wall 23 loosely when the plug-in cover 34 is plugged in perpendicularly.

Figure 7:
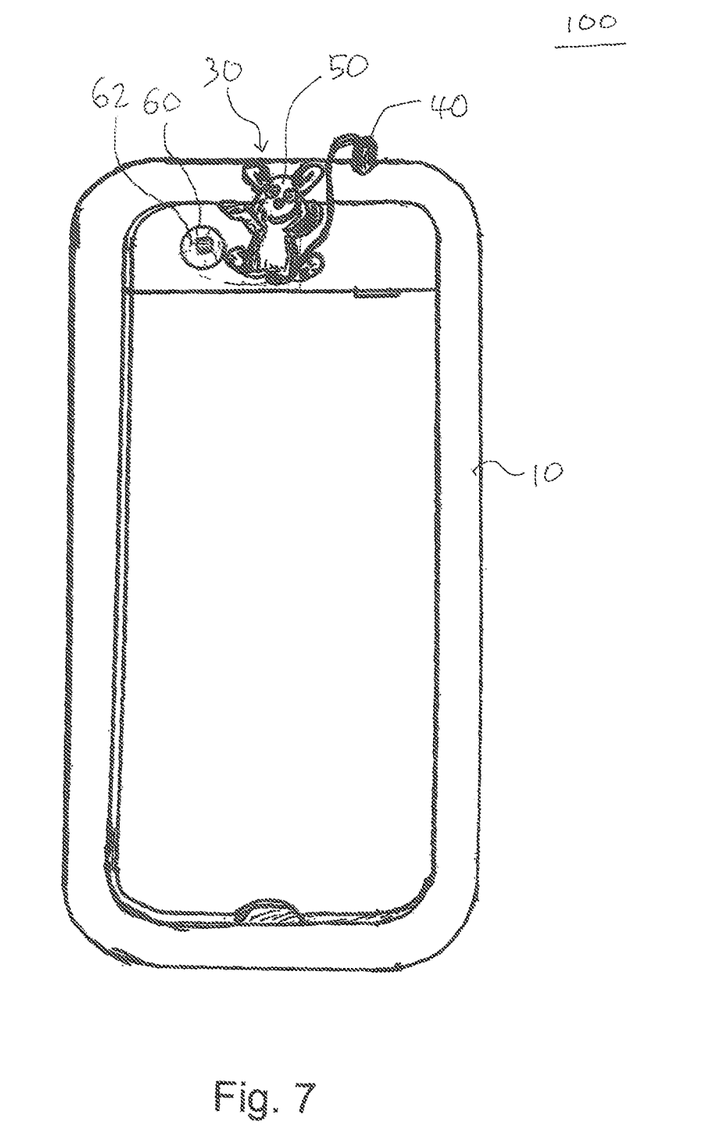
FIG. 7 is a front view showing a protective case with a decorating figurine according to another embodiment of the invention.
Figures 8, 9:
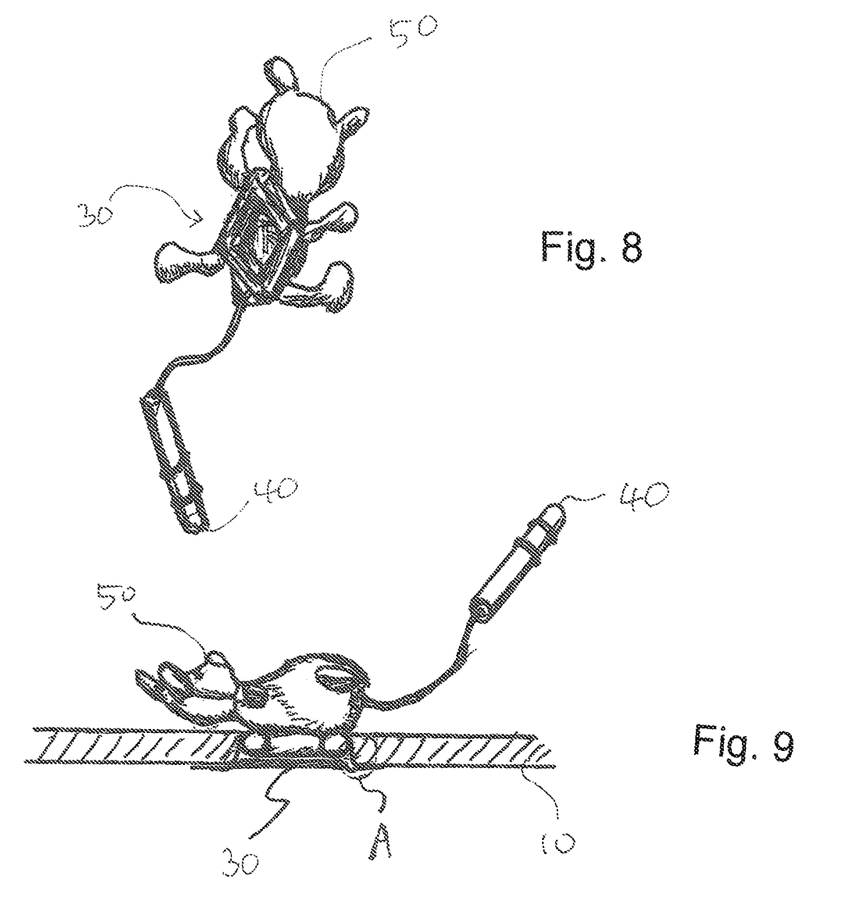

The protective case 100 may further comprise a decorating figurine 50 on the slide cover 32 as shown in FIGS. 7-9.

Another aspect of the invention provides a protective case 100 for a mobile device 900.

The protective case 100 comprises a body 10, a camera-exposing hole 20', a plug-in lens cover 30, and an earphone jack fastener 40.

The body 10 is for covering the rear face of the mobile device 900 and comprising a plurality of fastening portions 960 configured to fasten the mobile device 900.

Figure 10:
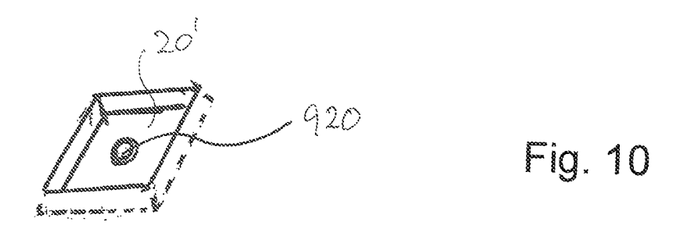
FIG. 10 is a perspective view of camera-exposing hole according to still another embodiment of the invention.
Figure 11:
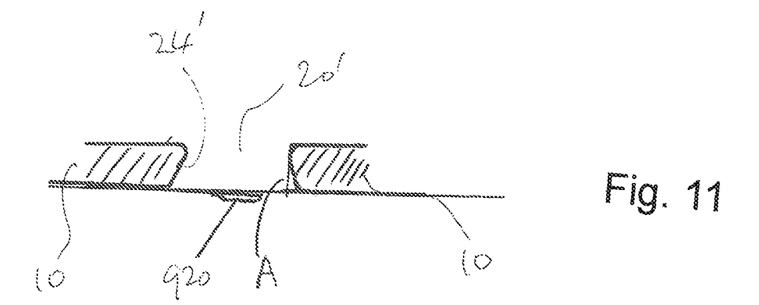
FIG. 11 is a cross-sectional view of the camera-exposing hole of FIG. 10.

The camera-exposing hole 20' is provided at an edge of the body 10 for exposing the camera lens 920 of the mobile device 900, and comprising an inner edge wall 24' as shown in FIGS. 10, 11.

The plug-in lens cover 30 is configured to be plugged in to the camera-exposing hole 20' perpendicularly to a surface of the body 10 and cover the camera lens 920.

The earphone jack fastener 40 has a first end connected to the plug-in lens cover 30 and a second end configured to be plucked into and held in an earphone jack 980 of the mobile device 900.

The inner edge wall 24' of the camera-exposing hole 20' may be tilted such that a top portion of the camera-exposing hole 20' is more narrow than a bottom portion of the camera-exposing hole 20' so as to receive and hold the plug-in lens cover 30.

The inner edge wall 24' of the camera-exposing hole 20' may be tilted by from about 5 degrees to about 15 degrees as shown in FIG. 11.

The plug-in lens cover 30 may comprise a plate portion 35 and a resilient sealing skirt 39 fixed to the plate portion 35 so as to be pressed down and held in the camera-exposing hole 20', and the resilient sealing skirt 39 may be disposed on the plate portion 35 in the place of plug-in cover 32, which was disposed in the slide cover 32 in the previous embodiment. That is, the plug-in lens cover 30 may look like the detachable lens cover 30 shown in FIG. 3 but the half toward the bent portion 38 cut off.

The protective case 100 may further comprise a decorating figurine 50 on the plate portion 35 of the plug-in lens cover 30. Alternatively, the outer surface of the plate portion 35 may be decorated with patterns or letters such as a logo instead of the 3D decorating figurine 50.

As in the previous embodiment, the inner edge wall 24' of the camera-exposing hole 20' may comprise a V-shaped protrusion 25' disposed in parallel to the surface of the body, and the V-shaped protrusion 25' comprises a top tilted wall and a bottom tilted wall in parallel to the surface of the body, and the bottom tilted wall is configured to receive and hold the resilient sealing skirt 39 of the plug-in lens cover 30, and the resilient sealing skirt 39 is connected to a surface of the plate portion of the plug-in lens cover through a supporting wall 390 as shown in FIG. 12.

A thickness of the body 10 may be determined such that some portion of obliquely incident light from outside is blocked through working together with the V-shaped protrusion.

The protective case 100 may further comprise a camera-flashlight hole 60 having a truncated conic opening as shown in FIGS. 13 and 14.

The camera-flashlight hole 60 may further comprise a reflecting surface 62 disposed on inner wall surface of the truncated conic opening.

For the camera-exposing hole 20' as shown in FIGS. 10 and 11, the plug-in lens cover 30 with the decorating figurine 50 as shown in FIGS. 8 and 9 may be appropriate. However, for the camera-exposing hole 20' having a profile as shown in FIG. 12, the plug-in lens cover having the resilient sealing skirt 39 with the supporting wall 390 as shown in FIG. 3 may be proper. Of course, in such cases, the plate portion 35 may be decorated with the decorating figurine 50.

In FIG. 15, the plate portions 35 are represented in dashed lines when plugged in as in FIGS. 5 and 6, not with solid lines when slid in as in FIGS. 3 and 4.

In certain embodiments of the invention, the resilient sealing skirt 39 and the supporting wall 390 may be made of silicon or rubber, natural or artificial, while the plate portion 35 may be made of anything hard such as plastic or metal.

Referring to FIG. 12, the structure of the camera-exposing cutout 20 or hole 20' minimizes the undesired reflection or interference from light from the camera flashlight.

On the other hand, the reflector 62 enhances the brightness of the flashlight. The reflector 62 may be of any type of reflecting material satisfying the purposes.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A protective case for a mobile device with a front face, a rear face, a top edge, a bottom edge, two side edges, a camera lens, and a camera flash light, the protective case comprising:

a body for covering the rear face of the mobile device and comprising a plurality of fastening portions configured to fasten the mobile device;

a camera-exposing cutout provided at an edge of the body for exposing the camera lens of the mobile device, and comprising an inner edge portion and two side edge portions; and a detachable lens cover comprising a slide cover and a plug-in cover, wherein the slide-cover portion is configured to be slid into and along the two side edge portions of the camera-exposing cutout and cover the camera lens, wherein the plug-in cover is configured to be plugged in to the camera-exposing cutout perpendicularly to a surface of the body and cover the camera lens.

2. The protective case of claim 1, wherein each of the two side edge portions comprises a V-shaped groove disposed in parallel to the surface of the body, wherein the V-shaped groove comprises a top tilted wall and a bottom wall, wherein the bottom wall is configured to receive and hold the slide cover and the top tilted wall is configured to receive and hold the plug-in cover.

3. The protective case of claim 2, wherein the slide cover comprises a plate portion having a first surface, a second surface, an outer edge extending and bending toward the second surface, and two side edges perpendicular or tilted with respect to the first surface so as to fit into to a top portion of the top tilted wall and a bottom portion the bottom wall of the V-shaped groove.

4. The protective case of claim 3, wherein the plug-in cover comprises a resilient sealing skirt so as to be pressed down and held in the V-shaped groove, wherein the plug-in cover is disposed on the second surface of the plate portion of the slide cover.

5. The protective case of claim 4, wherein the resilient sealing skirt is connected to the second surface of the plate portion of the slide cover through a supporting wall.

6. The protective case of claim 5, wherein each of the two side edges is configured to fit into or to be held close to the top portion of the top tilted wall loosely when the plug-in cover is plugged in perpendicularly.

7. The protective case of claim 3, further comprising an earphone jack fastener having a first end connected to the detachable lens cover and a second end configured to be plucked into and held in an earphone jack of the mobile device, wherein the earphone jack fastener is connected to the outer edge of the slide cover through a string.

8. The protective case of claim 2, wherein the inner edge wall of the camera-exposing hole is tilted such that a top portion of the camera-exposing hole is more narrow than a bottom portion of the camera-exposing hole so as to receive and hold the plug-in lens cover.

9. The protective case of claim 8, wherein the inner edge wall of the camera-exposing hole is tilted by from about 5 degrees to about 15 degrees.

10. The protective case of claim 8, wherein the plug-in lens cover comprises a plate portion and a resilient sealing skirt so as to be pressed down and held in the camera-exposing hole, wherein the resilient sealing skirt is disposed on a plate portion.

11. The protective case of claim 10, further comprising a decorating figurine on the plate portion of the plug-in lens cover.

12. The protective case of claim 1, further comprising a decorating figurine on the slide cover.

13. The protective case of claim 1, further comprising a camera-flashlight hole having a truncated conic opening.

14. The protective case of claim 13, wherein the camera-flashlight hole further comprises a reflecting surface disposed on inner wall surface of the truncated conic opening.

* * * * *